United States Patent [19]
Schulte et al.

[11] 3,931,017
[45] Jan. 6, 1976

[54] FILTER UNIT

[75] Inventors: Wilfried Schulte, Hofheim, Taunus; Horst Sowa, Frankfurt am Main; Klaus Kerger, Schwalbach, Taunus, all of Germany

[73] Assignee: Hoechst Aktiengesellschaft, Frankfurt am Main, Germany

[22] Filed: Apr. 25, 1974

[21] Appl. No.: 464,205

[30] Foreign Application Priority Data
Apr. 27, 1973 Germany............................ 2321320

[52] U.S. Cl. ................. 210/330; 210/344; 210/345
[51] Int. Cl.[2] ........................................ B01D 33/02
[58] Field of Search ........... 210/322, 324, 330, 331, 210/332, 340, 344, 359, 169, 345

[56] References Cited
UNITED STATES PATENTS

| | | | |
|---|---|---|---|
| 470,355 | 3/1892 | Sutton................................ | 210/330 |
| 3,292,791 | 12/1966 | Muller................................ | 210/330 |
| 3,297,163 | 1/1967 | London............................... | 210/169 |
| 3,662,894 | 5/1972 | Bockler.............................. | 210/332 X |
| 3,693,803 | 9/1972 | Guazzone........................... | 210/330 |

Primary Examiner—Theodore A. Granger
Attorney, Agent, or Firm—Curtis, Morris & Safford

[57] ABSTRACT

A filter unit for wet and dry filtration comprising a hollow shaft provided with ribs in parallel position with respect to the longitudinal axis of the said shaft, filter discs covered by a filtering material, said discs being stacked over and enclosing the shaft in positive connection therewith, the lower surfaces of the said filter discs having radial elevations the height of which corresponds to the distance between two adjacent discs, spacer rings provided with cams arranged between each filter disc and the respective filtering material, the said spacer rings enclosing the hollow shaft and the free cross sectional area between the cams of the said spacer rings diminishing from one disc to the other.

4 Claims, 4 Drawing Figures

FILTER UNIT

This invention relates to a filter unit with centering hollow shaft suitable for wet or dry filtration, particularly for wet or dry filtration with backwash.

Filter units are known having a hollow shaft provided on the circumference with ribs in parallel position with respect to the longitudinal axis, on which shaft the filter discs are stacked. Each filter disc is provided with a filtering material, for example a fabric, paper, or fleece, through which the stream of liquid or gas must pass. The substances to be separated deposit on the filtering material, from where they must be removed periodically. This is generally done by leading the stream of clarified fluid in reverse direction. Additionally, the residue on the filter can be removed by rotation of the filter unit. The backward flow of the fluid causes the filter material to bulge, whereby it is overstressed and hence, its lifetime is strongly reduced. Moreover the filtration costs are increased. To avoid bulging the filtering material is held by a type of spider consisting of a ring with radial spokes. The ring is placed between two adjacent discs and the spokes are fastened at the rims of the discs. A serious disadvantage of the known filter unit is the great number of individual elements which require much time for assembling.

It is the object of the present invention to provide a filter unit consisting of a few elements only which can be assembled in easy and simple manner and which ensure that the filtering agent is not damaged when the stream of gas or liquid is reversed.

The filter unit in accordance with the invention, suitable for wet and dry filtration, comprises a hollow shaft with ribs on the circumference in parallel position with respect to the longitudinal axis, filter discs covered with filtering material which are stacked over and enclose the shaft in positive connection therewith, the lower surface of the filter discs having radial elevations the height of which corresponds to the distance between two adjacent discs, and spacer rings with cams enclosing the shaft, which rings are mounted between the filter discs and the filtering material, the free cross sectional area between the cams of the spacer rings diminishing from filter disc to filter disc.

The filter unit according to the invention will now be described, by way of example, in further detail with reference to the accompanying drawing in which FIG. 1 shows a filter unit partly in section.

Figure 1:
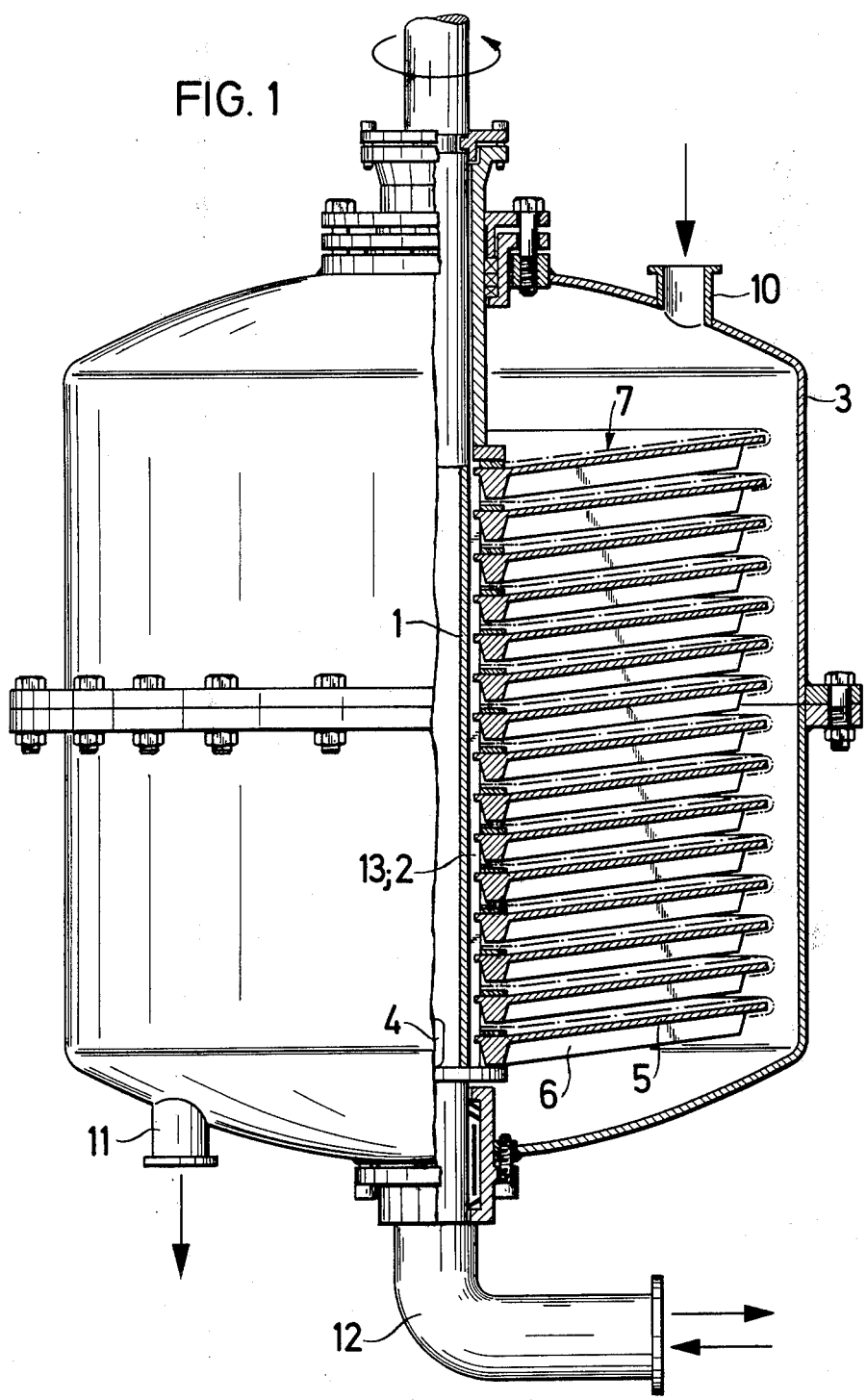

The hollow shaft 1 is rotatably mounted in filter casing 3 and provided with vertically extending ribs 2 in parallel position with respect to the longitudinal axis of the shaft. Ribs 2 form channels 13 along the shaft in which the clarified fluid runs off. It passes into the hollow shaft through orifices 4. Filter discs 5 are positively connected with the hollow shaft 1. At their lower surface they are provided with elevations 6, for example in the form of ribs, bulgings, cams or the like. The height of elevations 6 corresponds to the distance of two adjacent filter discs 5 from each other. The filter discs are covered with a filter material 7. Between the filter material and the filter discs a porous supporting layer, not represented on the drawing, may be inserted.

Figure 2:
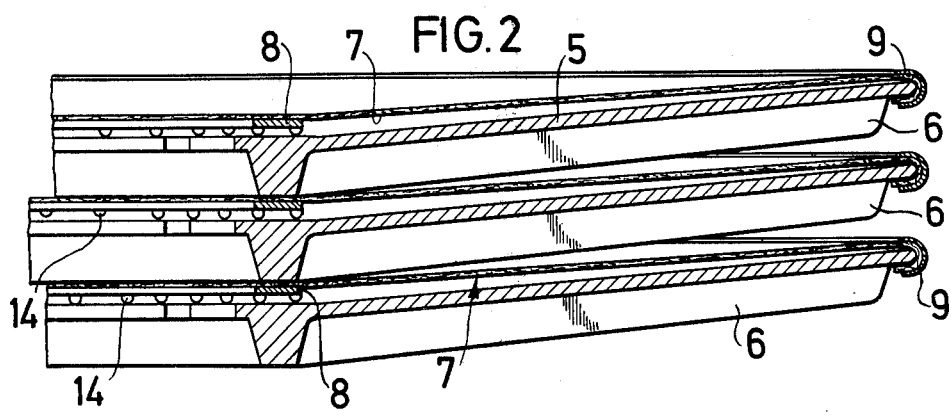
FIG. 2 is a side elevation in section of a part of the filter unit.
Figure 3:
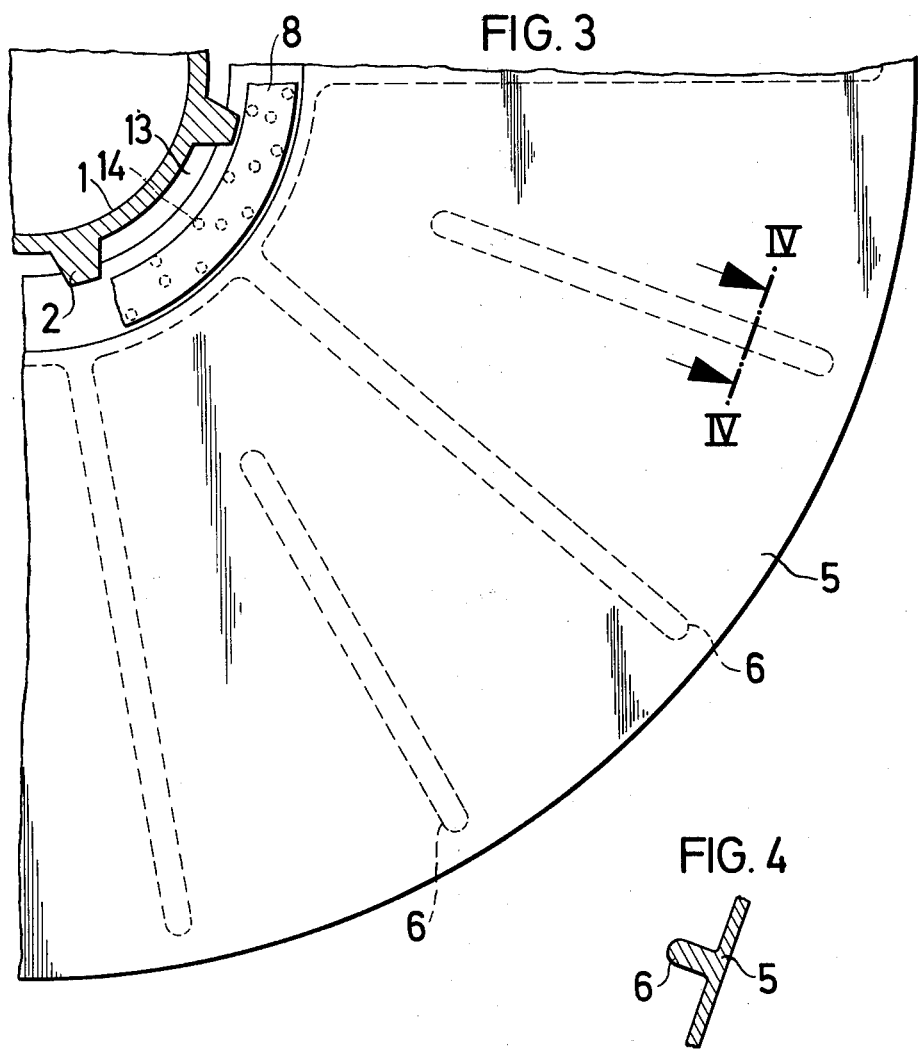
FIG. 3 is a top view of a part of a filter disc.
Figure 4:
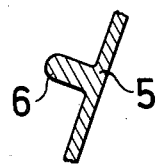
FIG. 4 is a cross sectional view of a part of a filter disc with elevation on line A — A of FIG. 3.

To allow the clarified fluid to flow into the hollow shaft spacer rings 8 are inserted between the filtering material and the respective filter disc, which spacer rings are provided with spaced cams or feet 14 so as to form a free cross sectional area. In order to ensure a uniform load on the filter material of all filter discs when the clarified fluid is led back it is advantageous to vary the free cross sectional areas between the cams from filter disc to filter disc as for example by varying the number of feet 14 on the rings 8, as seen in FIG. 2. It proved advantageous to position the spacer ring with the smallest cross section between the cams nearest to the inlet (i.e. the bottom of casing 3) through which the clarified fluid is led back for removing the residue from the filter material and the one with the largest cross section farthest from the said inlet (i.e. the bottom of casing 3). When the largest free cross section is equal to 100 %, the smallest free cross section should expediently be in the range of from 30 to 50 %. All other spacer rings have free cross sections in the range between 30 – 50 % and 100 %. In this manner, a dynamic pressure is produced owing to which the recycled clarified fluid is supplied to all filter discs under approximately equal conditions (pressure, speed).

By the elevations 6 and the graduation of the free cross sections between the cams of the spacer rings (FIG. 2) bulging and overstress of the filter material is avoided when the stream of filtered fluid is reversed. In the center of the filter disc the filter material is held between the spacer ring and the adjacent filter disc, while it is fastened at the outer rim of the disc by a clamping ring 9.

According to FIG. 1 turbid fluid is fed to the filter unit through inlet 10, the clarified liquid or gas passes the filter material 7 while the solid matter is held back. The clarified fluid passes through the free cross sections between the cams into the channels formed by the ribs 2 on shaft 1 and enters the hollow shaft 1 by the orifices 4.

To clean the filter material, i.e. to remove the deposit thereon, the stream of clarified fluid is reversed; it passes from conduit 12 via hollow shaft 1, orifices 4, channels 13 formed by ribs 2 and spacer rings 8 back to the filter material which is kept in position by elevations 6. To improve the cleaning effect the filter unit may be rotated whereby the filter residue is thrown off the filter material. It is removed from the casing 3 through outlet 11. The drive to rotate the filter unit is not represented on the drawing.

In the filter unit according to the invention the individual filter discs are arranged in vertical or in horizontal position. When a throwing off of the filter residue by rotation is not desired flat structures which are not symmetrical to rotation may also be used as filter discs. The filter discs can be made of metal, plastic material, for example chlorinated or not chlorinated polyolefins, reinforced artificial resins, such as polyesters and epoxide resins.

What is claimed is:

1. A filter unit for use in a filter casing having fluid inlet and outlet openings, said unit including a hollow shaft having a plurality of elongated radial ribs thereon extending along the length of the shaft, defining fluid flow channels therebetween, and filtrate outlet openings communicating with said channels and an outlet in said casing; a plurality of filter disks concentrically mounted in stacked superimposed relation on said shaft and each having first and second opposite surfaces with said second surfaces having radially extending ribs formed thereon of predetermined height; a plurality of spacer rings concentrically mounted on said shaft and respectively located between and engaged with adjacent pairs of filter disks, said rings each having a plurality of spacer cams formed on one side thereof engaging the first side of an immediately adjacent filter disk and defining a predetermined free cross-sectional area between the ring and the immediately adjacent filter disk engaged with its spacer cams, a plurality of filtering sheets respectively secured to said filter disks on the first side thereof, each of said sheets having inner ends positioned over the side of the spacer ring engaged with its associated filter disk which is opposite to the spacer cams thereof, thereby to define a fluid passage between the sheet and the disk which communicates through said free cross sectional area of the ring with the flow channels defined by said shaft ribs, whereby fluid to be filtered flows between the ribs on the second side of a filter disk through the filter medium on the first side of its adjacent filter disk to be filtered thereby, and the filtrate then flows into said passage to said channels and filtrate outlet openings in the shaft.

2. The filter unit as defined in claim 1 wherein the free cross-sectional area of said spacer rings diminishes from one filter disk to the other with the minimum cross-sectional area being located adjacent the outlet opening in said shaft and the maximum cross sectional area being located at the filter disk farthest from said outlet opening.

3. The filter unit as defined in claim 2 wherein said cross-sectional area is determined by the number of spacer cams on the respective spacer rings.

4. The filter unit as defined in claim 2 wherein the height of the radial ribs on said filter disks corresponds to the distance between two adjacent disks.

* * * * *